United States Patent [19]

Schleimer

[11] Patent Number: 5,566,607
[45] Date of Patent: Oct. 22, 1996

[54] GRILL WITH GREASE DEFLECTOR ASSEMBLY

[76] Inventor: Norman Schleimer, P.O. Box 75, Pound Ridge, N.Y. 10576

[21] Appl. No.: 439,230

[22] Filed: May 11, 1995

[51] Int. Cl.$^6$ .................................................. A47J 37/07
[52] U.S. Cl. ........................ 99/446; 99/400; 99/444; 126/39 C; 126/25 R; 126/41 R
[58] Field of Search ............................ 99/339, 340, 375, 99/444–446, 400, 425, 450, 422, 401, 447–449; 126/25 R, 41 R, 39 C, 39 R, 39 D, 275 E

[56] References Cited

U.S. PATENT DOCUMENTS

| | | | |
|---|---|---|---|
| 3,989,028 | 11/1976 | Berger | 126/41 R |
| 4,089,258 | 5/1978 | Berger | 99/339 |
| 4,321,857 | 3/1982 | Best | 99/340 |
| 4,535,749 | 8/1985 | Schlosser et al. | 126/25 R |
| 4,606,261 | 8/1986 | Bernardi | 99/445 |
| 4,608,917 | 9/1986 | Faaborg | 99/400 |
| 4,677,964 | 7/1987 | Lohmeyer et al. | 126/41 R |
| 4,727,853 | 3/1988 | Stephen et al. | 126/41 R |
| 4,762,059 | 8/1988 | McLane, Sr. | 99/446 |
| 4,777,927 | 10/1988 | Stephen et al. | 126/25 R |
| 4,829,978 | 5/1989 | Schlosser | 126/41 R |
| 4,860,724 | 8/1989 | Schlosser et al. | 126/38 |
| 4,886,044 | 12/1989 | Best | 99/400 |
| 4,941,817 | 7/1990 | Schlosser | 431/263 |
| 4,966,125 | 10/1990 | Stephen et al. | 126/25 R |
| 5,062,408 | 11/1991 | Smith et al. | 99/422 |
| 5,070,776 | 12/1991 | Schlosser et al. | 99/450 |
| 5,213,027 | 5/1993 | Tsotsos et al. | 99/339 |
| 5,265,586 | 11/1993 | Salerno | 99/444 |

Primary Examiner—Timothy F. Simone
Attorney, Agent, or Firm—Wolf, Greenfield & Sacks, P.C.

[57] ABSTRACT

A grease deflector assembly for use with a grill for cooking food, which grease deflector assembly includes an elongated slat of a noncombustible material for each row of heating elements of the grill. The length of each of the slats is at least equal to that of the corresponding row of heating elements and each slat extends downward at an angle from substantially the underside of a support element for the food to a position adjacent and spaced from at least the corresponding row of heating elements. Each slat also overlies the corresponding row of heating elements to prevent drippings from the food from touching the row of heating elements while providing an unobstructed path for radiant energy from the heating element to the food. The invention is usable with all types of grills including charcoal grills, gas grills and electric grills.

7 Claims, 3 Drawing Sheets

GRILL WITH GREASE DEFLECTOR ASSEMBLY

FIELD OF THE INVENTION

This invention relates to grills for cooking food and more particularly to an improved deflector structure for such grills.

BACKGROUND OF THE INVENTION

Various types of grills are commonly used for cooking meats and other foods. These grills may be portable, using charcoal briquettes or bottled gas, or may be installed in a patio, backyard or other location using for example natural gas or electricity.

One problem with all of these grills is that grease and other drippings from the food can touch the heating elements and can ignite producing flare-ups which can ruin the food being cooked. Grease forming on the heating elements, particularly for gas and electric grills, can also adversely affect both the appearance and operation of these heating elements. Cleaning grease from the heating elements is an unpleasant and time consuming job.

While deflectors have been proposed in the past to prevent grease from dripping on the heating elements, these deflectors have generally formed a protective cover over the heating element, preventing heat in the form of radiant energy from the heating elements from being directly transmitted to the food being cooked. This has adversely affected the efficiency of the grill. A need therefore exists for an improved deflector mechanism for grills which protects the heating elements from food drippings, while still providing a clear path for radiant energy from the heating elements to the food.

SUMMARY OF THE INVENTION

In accordance with the above, this invention provides a grill for cooking food, which grill includes a rack or other elements for supporting the food to be cooked, a plurality of rows of heating elements, each of the rows of heating elements being mounted below the food support and being spaced from adjacent rows, and a grease deflector assembly positioned between the food support element and the rows of heating elements. The grease deflector assembly includes an elongated slat of a non-combustible material for each row of heating elements. The length of each of the slats is at least equal to that of the corresponding row of heating elements and each slat extends downward at an angle from substantially the underside of the food support element to a position adjacent and spaced from at least the corresponding row of heating elements. Each slat also overlies the corresponding row of heating elements to prevent drippings from the food from touching the row of heating elements while providing an unobstructed path for radiant energy from the heating element to the food. The grease deflector assembly may include a support member at each end of the slats with each slat being secured to the support members at its corresponding ends.

Where the grill is a charcoal grill, the rows of heating elements include a briquette holder assembly having an elongated briquette rack for each of the rows. Briquette assemblies formed as a row of a selected number of briquettes connected together may be mounted in each briquette rack. Where the grill is a gas grill, each of the rows of heating elements is a gas manifold. The row of heating elements may also include a lava rock holder containing lava rock which is mounted above each gas manifold. Where the grill is an electric grill, each row of heating elements includes an elongated electric heating element.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 1:
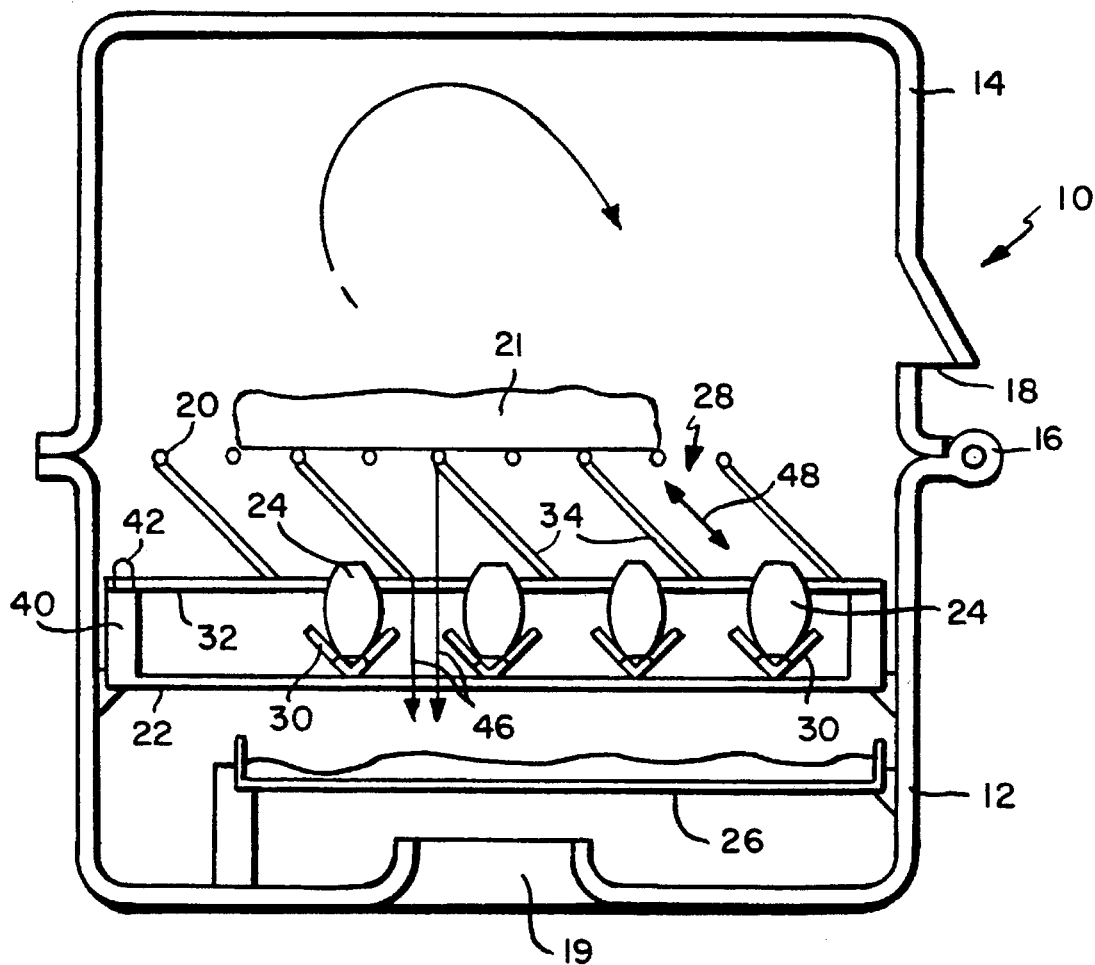
FIG. 1 is a side sectional view of a charcoal grill containing a deflector assembly of this invention.

Referring first to FIG. 1, a charcoal grill embodiment 10 is shown, the grill being formed by a base 12 and a top 14 which are connected by a hinge 16. Base 12 has an air inlet opening 19 through which air may enter the grill and an exhaust hole or vent 18 is provided in top 14 to permit hot gases to escape from the grill when the grill is closed. Inside the grill there is a rack 20 for supporting the food 21 to be cooked, a briquette holder assembly 22 for supporting briquettes 24 which are used to heat the food and a tray 26 for collecting fat and drippings from the food and ash from burned briquettes.

Figure 2:
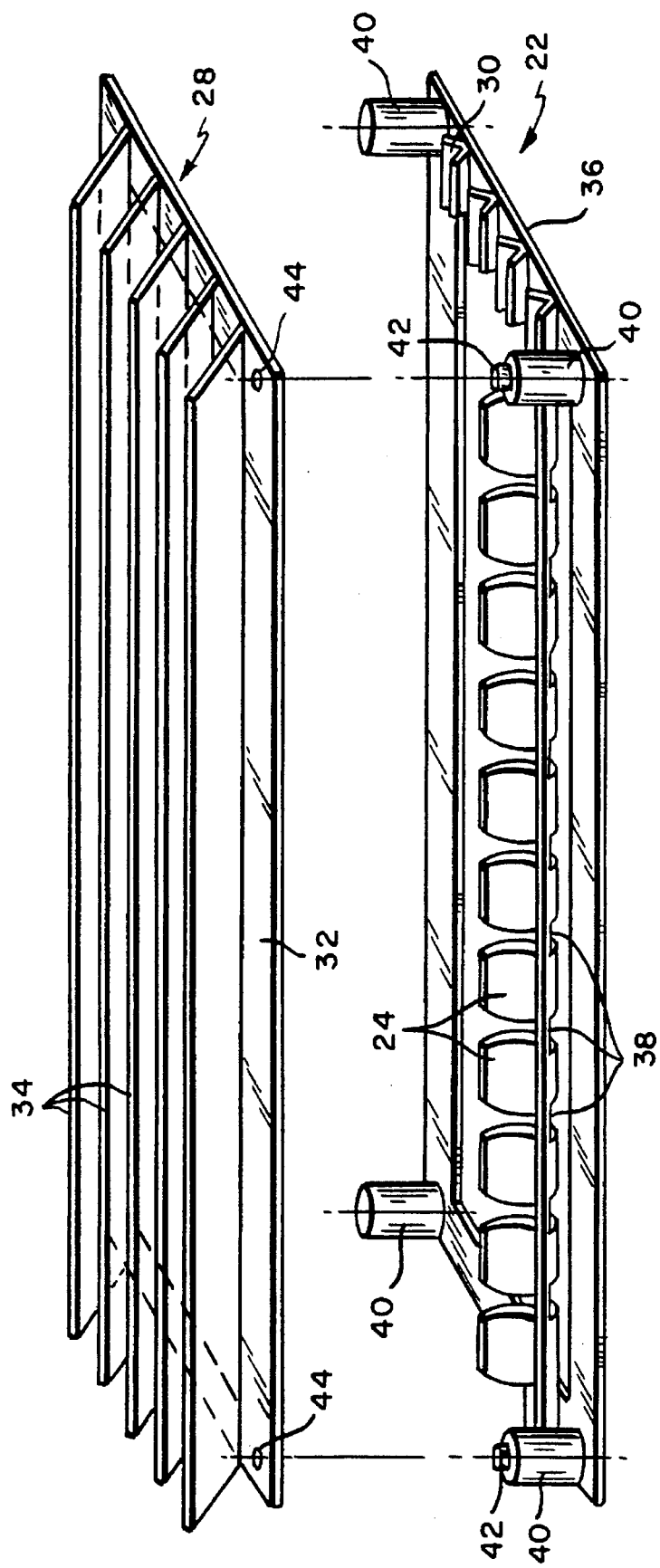
FIG. 2 is an enlarged, exploding front perspective view of the deflector assembly and briquette support assembly for the embodiment of FIG. 1.

What has been described so far are elements of a standard charcoal grill. The differences for this invention are first, the inclusion of a deflector assembly 28 for fats and other drippings from food 21 and the racks 30 which make up briquette holder assembly 22. Referring both to FIGS. 1 and 2, it is seen that assembly 28 consists of a rectangular frame 32 and a plurality of elongated slats 34 which extend upward from the frame at an angle. Briquette holder assembly 22 also has a rectangular frame 36 to which the racks 30 are attached at their ends. Each rack is trough-shaped and has openings 38 formed therein through which ashes may fall or be pushed from burned briquettes. Racks 30 extend parallel to each other and are fixed at their ends to oppose frame members. A spacer post 40 extends upward from each corner of briquette holder frame 36, with two of the posts ending at their upper ends in a registration pin 42. A registration hole 44 is provided in two corners of deflector assembly frame 32 which fit over the corresponding pin 42 to permit easy mounting and removal of the deflector assembly. The deflector assembly can therefore be mounted on the briquette holder assembly only in the orientation shown.

As is best seen in FIG. 1, the deflector slats 34 extend at an angle from just under food rack 20 to a position between adjacent briquettes mounted in assembly 22 (which end slats terminating adjacent but not over a briquette). The deflector slats also overlay corresponding briquette racks 30 and any briquettes mounted therein. The effect of this arrangement is to prevent any substantial amount of grease or other food drippings from touching the briquettes 24 or the briquette racks 30, such drippings flowing along the slats and between the briquettes and briquette racks to tray 26 as illustrated by arrows 46 in FIG. 1, while providing a clear, unobstructed path for radian energy from the briquettes to food item 21 as illustrated by arrows 48.

In operation, deflector assembly 28 may be mounted on posts 40 or may be removed for operation of the grill in conventional fashion. The deflector assembly would initially be removed to permit briquettes to be positioned on the briquette racks 30. This may be done by hand on a briquette-by-briquette basis, or the briquettes may be provided with a number of briquettes connected together in a row to form a briquette assembly so that one or two such assemblies might fill a rack. Once the briquettes have been mounted and lighted (glowing), the deflector assembly would be put in place, the food rack with the food to be grilled would be put in place, and the grilling operation started. It is noted that with the briquettes mounted in the rows, each row would need to be ignited separately.

Figure 3:
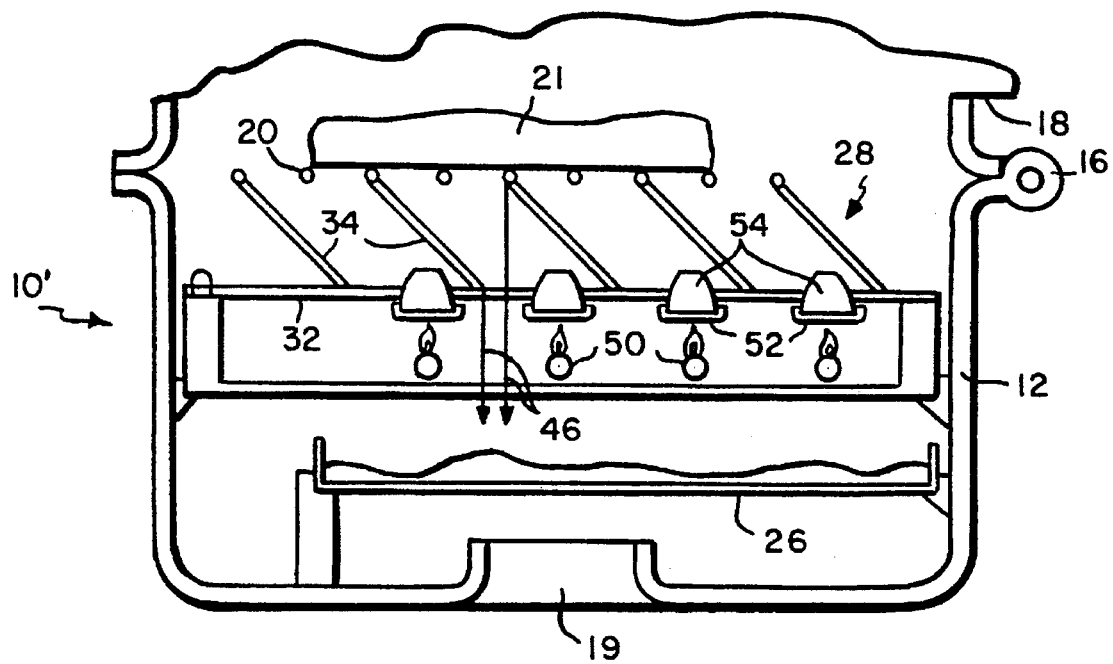
FIGS. 3 and 4 are partial side sectional views for gas grill and electric grill embodiments of the invention, respectively.
Figure 4:
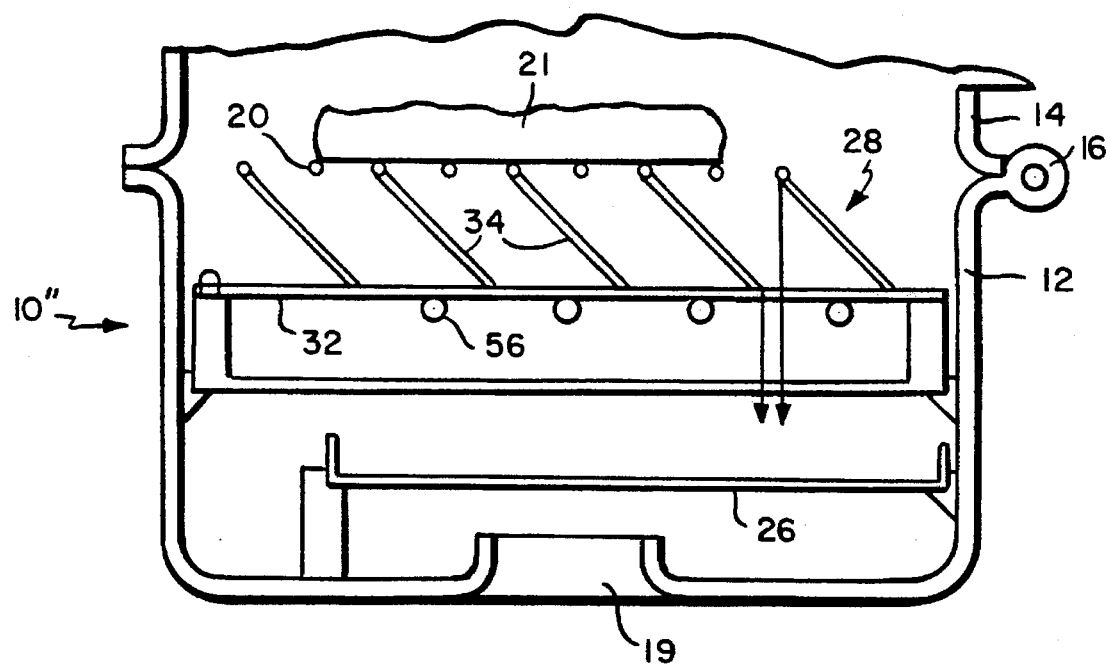

FIG. 3 shows a gas grill embodiment of the invention which differs from the embodiment shown in FIGS. 1 only in that gas manifolds 50 and lava rock racks 52 having lava rock elements 54 mounted thereon are substituted as the heating elements for the briquette holder assembly and briquettes shown in FIG. 1. Similarly, FIG. 4 shows an electric grill embodiment of the invention wherein electrical heating elements 56 are substituted for the heating elements shown in the prior embodiments. However, the deflector assemblies 28 for each of these embodiments are the same, and function to protect the heating element in the same way, as for the charcoal grill embodiment of FIGS. 1 and 2.

While a particular deflector configuration has been shown above as a preferred embodiment for use with various exemplary grills, it should be understood that the disclosed embodiments are for purposes of illustration only and that various changes in form and detail may be made in the deflector assembly and in the grills while still remaining within the spirit and scope of the invention, the invention being defined by the following claims.

What is claimed is:

1. A grill for cooking food comprising:
   an element for supporting the food to be cooked;
   a plurality of rows of heating elements, each of said rows being mounted below said element and being spaced from adjacent rows; and
   a grease deflector assembly positioned between the element and the rows of heating elements, said assembly including an elongated slat of a non-combustible material for each row of heating elements, the length of each slat being at least equal to that of the corresponding row of heating element, and; each slat extending downward at an angle from substantially the underside of the element to a position adjacent to and spaced from at least the corresponding row of heating elements, the slat overlying the corresponding row of heating elements to prevent drippings from the food from touching the row of heating elements while permitting drippings off the end of a slat to pass between adjacent rows of heating elements and providing an unobstructed path between adjacent slats for radiant energy from its heating elements to the food.

2. A grill as claimed in claim 1 wherein the grill is a charcoal grill, and wherein the rows of heating elements includes a briquette holder assembly having an elongated briquette rack for each of said rows.

3. A grill as claimed in claim 2 wherein said heating elements include briquette assemblies formed by a row of a selected number of briquettes connected together, which briquette assembly is mounted in a briquette rack.

4. A grill as claimed in claim 3 wherein said grill is a gas grill, and wherein each of said rows of heating elements includes a gas manifold.

5. A grill as claimed in claim 4 including a lava rock holder containing lava rock above each of said gas manifolds.

6. A grill as claimed in claim 1 wherein said grill is an electric grill, and wherein each of said rows of heating elements includes an elongated electrical heating element.

7. A grill as claimed in claim 1 wherein said grease deflector assembly includes a support member at each end of the slats, each slat being secured by the support members at its corresponding ends.

* * * * *